March 23, 1965     T. G. KLAPHEKE     3,175,055

ADJUSTABLE ELECTROLYTICALLY ACTUATED TIME-DELAY SWITCH

Filed March 11, 1963

INVENTOR.
THOMAS G. KLAPHEKE
BY
Lockwood, Woodard, Smith & Weikart
Attorneys

United States Patent Office 3,175,055
Patented Mar. 23, 1965

3,175,055
ADJUSTABLE ELECTROLYTICALLY ACTUATED
TIME-DELAY SWITCH
Thomas G. Klapheke, Fort Wayne, Ind., assignor to The
Magnavox Company, Fort Wayne, Ind., a corporation
of Delaware
Filed Mar. 11, 1963, Ser. No. 264,201
5 Claims. (Cl. 200—61.05)

This invention relates to an electrolytic selectable time delay switch for disengaging power supply from an electronic system. More specifically, the invention relates to a variable time delay switch having an electrolytic current electrolyte to sever the anode element and thereby opening a power supply circuit.

Heretofore, time delay switches have been devised which make use of corrosion of an element to eventually effect some switch action. Some such switches use an element which corrodes and ultimately fails to activate a spring biased element, release a plunger, or trigger or some other type of mechanical action. Such devices are usually complicated and susceptible to malfunction by virtue of the corrosive environment which is actually necessary to make them work. Also, some of these devices require a built-in and sealed chamber for electrolyte. Another disadvantage of these devices is the fact that generally the time delay setting is fixed and cannot be varied without disassembly of the unit and change of parts. It will be recognized that because of the aforesaid deficiences of switches heretofore known they are unsatisfactory for many applications.

It is, therefore, an object of the present invention to provide an improved time delay switch.

It is a further object of this invention to provide a time delay device of simple and reliable construction.

It is a further object of this invention to provide a time delay switch which can be easily set to provide any one of a group of specific time delay periods.

A still further object of this invention is to provide a switch having the foregoing characteristics and employing electrochemical corrosion to provide the desired time delay.

It is a still further object of the invention to provide a switch having the foregoing characteristics and adapted to use an external reservoir of electrolyte, such as, for example, sea water.

Described briefly, a typical embodiment of the present invention employes an electrode such as zinc, for example, as a serial connecting element to conduct load currents in a power supply circuit. The zinc element is disposed in a case which can be submerged in an electrically conductive water solution, such as salt water, and a movable element is provided on the case having passageways of various sizes by which the salt water can be admitted into contact with the zinc element. The device is incorporated in a circuit, the negative side of which is coupled through the salt water to the zinc element and the positive side of which is connected to the element in the load circuit. The corrosion rate of the zinc element is controlled by setting the movable element to provide the desired size of passageway in communication with the zinc element to control resistance of the electrolyte to the corrosion current.

The full nature of the invention will be understood from the accompanying drawings and the following description of claims:

Figure 1:
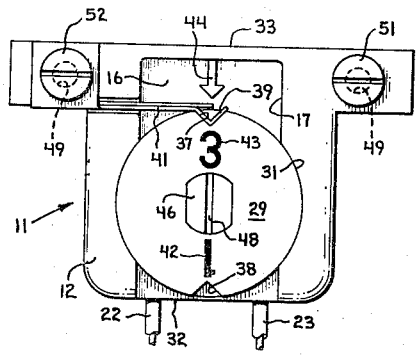
FIG. 1 is a front view of a typical embodiment of the present invention with the switch adjusted to provide a three-hour time delay.
Figure 5:
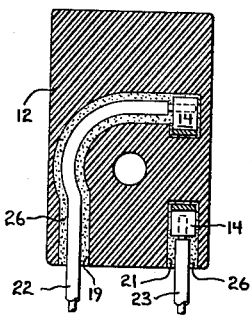
FIG. 5 is a horizontal section taken on the line 5—5 of FIG. 3 and viewed in the direction of the arrows.
Figure 6:
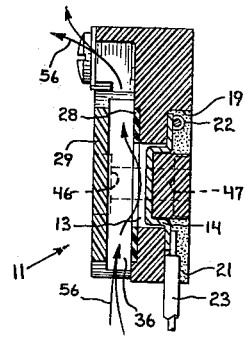
FIG. 6 is a vertical section taken on line 6—6 of FIG. 2 and viewed in the direction of the arrows.
Figure 2:
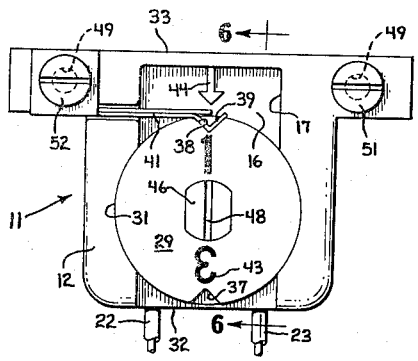
FIG. 2 is a front view of the switch of FIG. 1, but adjusted for a one-hour delay.

Referring now to the drawings where like numbers designate like parts throughout the several views and more particularly to FIGS. 1 through 6, there is shown an example of an electrolytic selectable time delay switch according to this invention and indicated generally by the reference numeral 11. It includes a molded base 12 which may be composed of an insulating material suitable for the purpose, for example, Cycolac (acrylonitrile-butadiene-styrene co-polmer) having a chamber 13 to receive and position the corrodible element 14 which is usually of zinc, though some other materials may be found to work as well. Chamber 13 communicates with the face 16 of channel 17 in the base through opening 18 in the base. The base includes channels 19 and 21 for the reception of the lead wires 22 and 23, respectively, from the electronic system to be regulated, such channels being recessed so that the lead wires and contacts to the element 14 may be encapsulated with any suitable potting compound 26 such as, for example, an epoxy or epoxy base resin.

A cylindrical recess 27 is provided on the face of the base opposite the lead wires, the recess being designed to retain a gasket 28, usually of rubber, and the cylindrical cap 29 of any suitable insulating material such as, for example, Cycloac. The gasket is such as to exclude the entrance of electrolyte around the major portion of the periphery 31 of the cap, yet of such nature as to allow for easy rotary movement of the cap. The channel 17 extending from the bottom 32 of the base almost to the top 33 of the base allows ready access of electrolyte to the slots 34 and 36 molded in the cap.

The cap may possess a multiplicity of slots (only two of which are shown) molded therein as chords of a circle spaced appropriately on the circle with each slot varying from the other in cross sectional area, slot 34 being of much smaller section than the slot 36 in the illustrated embodiment. Notches 37 and 38 are provided in the periphery 31 and properly indexed with respect to the slots 34 and 36, respectively, for registry of one of the slots with opening 18 when its respective notch is engaged by locator 39 of index spring 41. Each notch has an appropriate number impressed in the cap adjacent the notch to indicate the time setting obtained when the index spring engages the notch. For example, the number "1," designated by reference numeral 42 indicates that when its notch 38 is engaged by index spring 41, slot 36 is in registry with opening 18 to provide a one-hour time setting. Similarly the number "3" designated by reference number 43 indicates a three-hour setting when its notch 37 is engaged by index spring 41. The pointer 44 impressed in face 16 of the channel 17 facilitates designation of the time setting.

When the device incorporating the switch of the present invention is submerged in a reservoir of electrolyte, the electrolyte may pass through the cap slots. The electrolyte passing through the slot in registry with the opening 18 communicates with chamber 13 and envelopes the element 14 or a portion thereof. This can be readily appreciated by reference to FIG. 6 where the circulation through slot 36 in registry with opening 18 is represented by the arrows 56. In this manner a path is established for an electrochemical corrosion current and the cross sectional area of the slot registering with opening 18 as well as the length of the slot control the resistance of the electrochemical corrosion current path.

Figure 7:
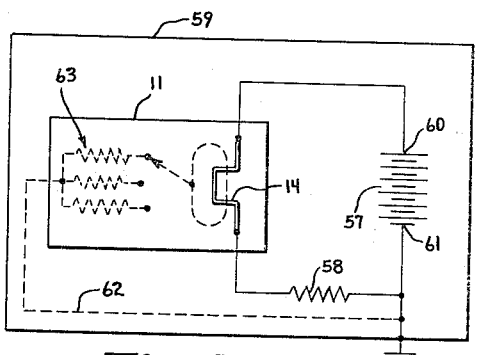
FIG. 7 is a schematic diagram of the circuit according to a typical embodiment of the invention incorporating the switch shown in FIGS. 1 through 6.
Figure 4:
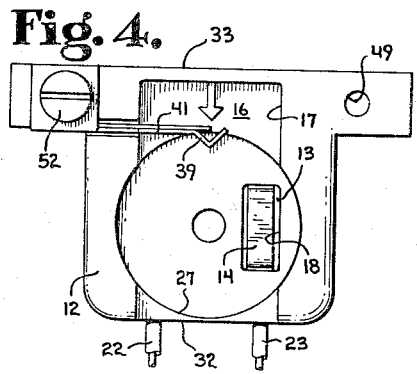
FIG. 4 is a front view of the switch with the adjustable cap removed to illustrate the appearance of the anode housing with the anode exposed therein.

In FIG. 7, the switch of the present invention is designated generally by the block 11 and the element 14 is shown in a series connection with the battery 57 and load 58. The entire unit is enclosed in a housing 59 which may be, for example, a metal shell or body of a buoy. The load 58 may be, for example, an electronic system power supply. The battery 57 may be a salt water battery if desired.

The electrochemical current path between the element 14 connected to positive terminal 60 of the battery 57 and the negative terminal 61 of the battery is designated schematically by the dotted line 62. Element 14 is therefore an anode as to the electrochemical current path. This path is through the electrolyte in which the unit is submerged and may, of course, be completed partially within the housing 59 and partially exterior to the housing 59, depending upon construction details of the housing which are not a part of this invention. Anode 14 corrodes at a rate which depends upon the current flow in the electrochemical current path. When the anode 14 corrodes to failure, it opens the load circuit to disconnect the battery 57 from load 58.

The part of the electrochemical current path 62 shown in FIG. 7 and which is adapted to be changed to give any desired one of several resistance values to the path is the part within the switch 11 and designated by the reference numeral 63. This part corresponds to the rotary cap of the previous figures with its various sizes of slots. This switch is capable of being time selectable in the field.

The selectability of this device is accomplished by adjusting the size of a slot in the electrolytic path, thus varying the resistance of the electrolytic path between the zinc anode and a cathode in contact with the electrolyte and connected to the negative terminal 61 of the battery. Resistance can be expressed as follows:

$$R = p\frac{L}{A}$$

$p$ = Resistivity of sea water
$L$ = Length of slot
$A$ = Area of slot
$R$ = Resistance of slot Therefore as the slot is changed from a smaller to a larger area, the resistance will decrease causing increase of corrosion current which accelerates corrosive action of the zinc anode. Thus, the described embodiment achieves its object of providing a device for breaking an electrical circuit at a predetermined time by corroding away one of the circuit conductors by means of an adjustable electrolytic current using the potential normally applied to the conductor. At the same time, the rest of the aforementioned objects are achieved.

It should be recognized that the negative terminal 61 of the battery 57 need not be directly exposed to the electrolyte and that it can, if desired, be connected through other electrical elements to a metallic plate in contact with the electrolyte. Other variations of construction will be immediately recognized by one skilled in the art having considered this disclosure to this point and are contemplated by the inventor herein though not all can conveniently be mentioned in this application.

Figure 8:
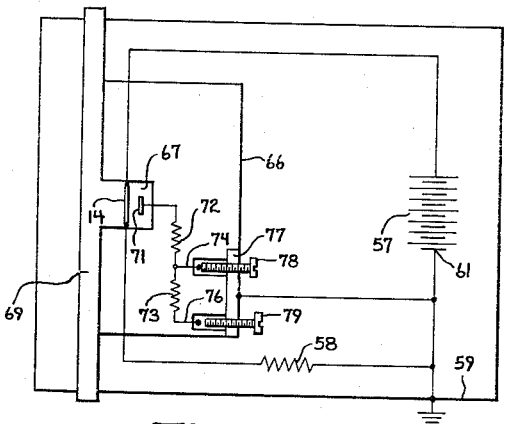
FIG. 8 is a schematic diagram of a variation of the switch and the circuit according to another embodiment of this invention.
Figure 3:
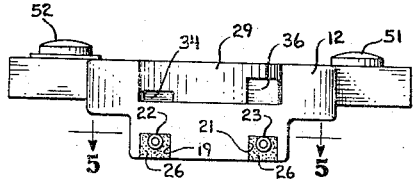
FIG. 3 is a bottom plan view of the switch with the one-hour setting of FIG. 2.

Referring to FIG. 8, there is illustrated schematically another embodiment of this invention. In this embodiment, a circuit is provided with a battery 57, anode 14, and a load 58 in series circuit relationship. Again, the negative terminal 61 of the battery may be secured, if desired, to a metal housing 59.

However, in this embodiment the switch unit includes a body 66 having a chamber 67 therein which communicates with the electrolyte reservoir by means of tubing 69. The tubing permits entry of electrolyte into the chamber 67 and permits escape of air as well as any gas generated. The tube has a large ratio of length to area, thus providing a high resistance electrical path through the electrolyte therein and thus controls the electrolytic current which flows through this path from the anode 14 to the battery negative terminal 61.

A cathode 71 is provided in the chamber 67 and by virtue of its size and close spacing to the anode 14 provides a low resistance electrical path through the electrolyte in chamber 67 between the anode 14 and cathode 71.

In this embodiment resistors 72 and 73 are serially connected to the cathode 71 and a tap 74 is provided between the two resistors and a tap 76 is provided at the end of the resistor 73 remote from cathode 71. The resistors should be understood to be embedded in the body 66 or at least isolated from the electrolyte.

A tapped metal insert 77 is provided in the body 66 of the switch and is connected to the negative terminal 61 of the battery 57. By turning in the screw 78, contact is made between the tap 74 and negative terminal 61 to provide the principal corrosion current path for the switch. If a higher resistance path for a different time setting is desired, the screw 78 is disconnected from tap 74 and the screw 79 is turned in to contact tap 76.

By making the electrolytic path between anode 14 and cathode 71 relatively low in resistance, most of the resistance controlling the rate of corrosion is in the resistors 72 or 73 or both as the case may be. In this way consistent operation is obtained, substantially independent of the variation of resistance in the electrolytic path due to variations in salinity and temperature.

In the practical application of the present invention, zinc is usually chosen for the anode material to eliminate problems from gassing and excessive corrosion products. However, the device is not limited to the use of zinc, specific materials or constructional details mentioned herein, nor is it limited to the use of sea water for its electrolyte.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. A time delay switch device comprising:
   a base having a chamber therein;
   a first electrical circuit including an electrochemically corrodible circuit element in said chamber;
   an electrolyte;
   a source of electrical energy having an output terminal of positive polarity coupled to said corrodible element;
   an output terminal of negative polarity on said source being coupled to said electrolyte;
   and a switching member movably mounted on said base and having first and second switched positions thereon, said switching member having a first passageway admitting said electrolyte to said chamber when said switching member is in said first position and establishing a second electrical circuit including an electrochemical current path between said corrodible element and said negative output terminal of said source,
   said first passageway being of specific dimensions to establish a first predetermined electrical resistance of said electrochemical current path,
   said switching member having a second passageway therein separate from said first passageway, and said switching member being movable from said first position to said second position to switch electrolyte in said first passageway out of said second electrical circuit and admit electrolyte to said chamber through said second passageway and thereby switch electrolyte in said second passageway into said second electrical circuit, the dimensions of said second passageway being different from the dimensions of said first passageway to establish a second predetermined electrical resistance of the electrochemical current path in said second electrical circuit.

2. A time delay switch device comprising:
a base having a chamber therein;
an electrochemically corrodible circuit element in said chamber;
an electrolyte;
a source of electrical energy having an output terminal of positive polarity coupled to said corrodible element;
an output terminal of negative polarity on said source being coupled to said electrolyte;
and a switching member having passageway means communicating with said chamber and admitting said electrolyte to said chamber and establishing an electrochemical current path between said corrodible element and said negative output terminal of said source,
said switching member being movably mounted on said base, with the passageway means therein being formed to vary the dimensions of the electrochemical current path as said switching member is moved on said base whereby the electrical resistance of said electrochemical current path is varied by movement of said switching member on said base.

3. In an electrolytically actuated time delay switch,
a base having a space therein,
an electrochemically corrodible element in said space,
an opening in said base communicating with said space,
a cap covering said opening,
said cap having a first passageway therein registering with said opening to admit an electrolyte to said space upon immersion of said base into electrolyte,
said cap being movable to move said passageway out of registry with said opening,
and said cap having a second passageway therein of a size different from that of said first passageway and movable into registry with said opening when said first passageway is out of registry.

4. In an electrolytically actuated time delay switch,
a base having a space therein,
an electrochemically corrodible element in said space,
an opening in said base communicating with said space,
a cap covering said opening,
said cap having a first passageway therein registering with said opening to admit an electrolyte to said space upon immersion of said base into electrolyte,
said cap being movable to move said passageway out of registry with said opening,
and said cap having a second passageway therein of a size different from that of said first passageway and movable into registry with said opening when said first passageway is out of registry,
said cap being pivotally mounted to said base and being generally cylindrical in form,
said passageways being located as chords of a circle having the cylindrical axis of the cap as its center.

5. In an electrolytically actuated time delay switch,
a base having a space therein,
an electrochemically corrodible element in said space,
an opening in said base communicating with said space,
a cap covering said opening,
said cap having a first passageway therein registering with said opening to admit an electrolyte to said space upon immersion of said base into electrolyte,
said cap being movable to move said passageway out of registry with said opening,
and said cap having a second passageway therein of a size different from that of said first passageway and movable into registry with said opening when said first passageway is out of registry,
said cap being pivotally mounted to said base and being generally cylindrical in form,
said passageways being located as chords of a circle having the cylindrical axis of the cap as its center,
said base and said cap having interengageable locators thereon to maintain a selected relative position between said cap and said base maintaining registry of one of said passageways with said opening,
and said switch having indicia thereon to identify the time delay of the switch corresponding to the passageway in registry.

References Cited by the Examiner
UNITED STATES PATENTS 2,551,608   5/51   Kissinger  ------------ 200—61.04
2,741,182   4/56   Faust et al.  ------------ 102—82

BERNARD A. GILHEANY, *Primary Examiner.*
ROBERT K. SCHAEFER, *Examiner.*